July 29, 1958

H. S. HARRISON

2,845,034

CONVEYOR SYSTEM INCORPORATING POWER TROLLEY LINE, BRANCH
FREE TROLLEY LINE, AND AUTOMATIC
LOAD TRANSFER THEREBETWEEN

Filed June 29, 1953

INVENTOR.
HOMER S. HARRISON
BY

July 29, 1958

H. S. HARRISON 2,845,034

CONVEYOR SYSTEM INCORPORATING POWER TROLLEY LINE, BRANCH
FREE TROLLEY LINE, AND AUTOMATIC
LOAD TRANSFER THEREBETWEEN

Filed June 29, 1953

INVENTOR.
HOMER S. HARRISON
BY

INVENTOR.
HOMER S. HARRISON

2,845,034

CONVEYOR SYSTEM INCORPORATING POWER TROLLEY LINE, BRANCH FREE TROLLEY LINE, AND AUTOMATIC LOAD TRANSFER THEREBETWEEN

Homer S. Harrison, Detroit, Mich., assignor to Allied Steel and Conveyors, Inc., Detroit, Mich., a corporation of Michigan Application June 29, 1953, Serial No. 364,758

30 Claims. (Cl. 104—96)

This invention relates to an overhead trolley conveyor system wherein power driven trolleys circulate around an endless conveyor track and free trolleys move on one or more adjoining branch conveyor tracks together with means for effecting automatic load transfers from loaded free trolleys to unloaded power trolleys at one branch juncture and from loaded power trolleys to unload free trolleys at another branch juncture.

The preferred embodiment of the present system employs an endless power conveyor line with chain driven trolleys each provided with a rigid load engaging suspension hook; one or more free trolley conveyor tracks which at transfer points extend above and, in plan view, tangent to the power track; free trolleys having offset load bars adapted to depend laterally past the power trolleys each with a load engaging hook at the lower end adapted to extend below the load engaging hook of a power trolley at a transfer point; and load hangers having separate provision for engaging either a power trolley hook or a free trolley hook. In effecting a transfer of a load hanger on a power driven trolley to a free trolley positioned at a transfer point, the load hanger is adapted to engage the hook of the free trolley and propel such trolley up an inclined section of the free conveyor track causing the free trolley hook to raise the load hanger out of engagement with the power trolley hook after which a brief continued propulsion of the loaded free trolley by the unloaded power trolley moves the free trolley onto a downwardly inclined curved section of the free conveyor track which leads the loaded free trolley away from the path of the power conveyor line. With such general arrangement a free trolley positioned to receive the next load to come along the power line at a transfer point will automatically pass any unloaded power trolleys which may precede such loaded power trolley so that the free trolley may be left unattended at the transfer point until such time as a loaded power trolley comes along the power line and automatically effects the transfer as described above.

To effect a load hanger transfer from a free trolley to a power trolley, the free track is provided with a downward slope at the tangent transfer section of the two conveyor tracks, the load hanger being adapted for engagement by the power trolley hook and disengagement from the free trolley hook while the free trolley precedes down such slope. In this case a loaded free trolley may not be left directly in the path of the power line to await the next unloaded power trolley without involving interference from preceding loaded power trolleys. Nevertheless, in order to permit a loaded free trolley to be left unattended at a free-to-power transfer section while any loaded power trolleys pass, provision is made for leaving such loaded free trolley at a point on the free conveyor track approaching the power conveyor track together with automatic mechanism responsive only to the approach of an unloaded power trolley toward the transfer section for completing the movement of the loaded free trolley into the path of the power line where such unloaded power trolley will thereupon engage the load hanger as previously described. Such automatic mechanism is also adapted to thereupon move the unloaded free trolley onto a curved section of the free conveyor track leading away from the power line where it will not interfere with subsequent passing loaded power trolleys. This automatic transfer in response to the approach of an unloaded power trolley is accomplished by a transfer drive utilizing power and selectively solely derived from the main power conveyor and incorporates mechanism likewise powered by the main conveyor for reconditioning the transfer mechanism for subsequent transfers so that an operator need only move a loaded free trolley to the mentioned point on the free conveyor track approaching the power conveyor and leave the same for automatic transfer to the first unloaded power trolley to pass the transfer section.

The system briefly outlined above incorporates a number of advantages from the standpoint of installation and maintenance costs, versatility and flexibility to varying requirements, and minimization of operator attendance as compared with prior systems for alternate power and free conveyance. Thus in prior systems wherein the load is continuously carried by the same trolley assembly which may be propelled along a power line by drive dogs on a power conveyor chain and wherein movable track switches are employed for shunting such trolley to branch free lines, it is necessary to provide a double conveyor track along the power line to carry the respective drive chain wheels and load trolley wheels as well as separate motor or manual mechanism for actuating the track switches. In addition, special interlocking automatic controls or diligent operator supervision must be relied upon in order to coordinate track movement with the power conveyor line and loads propelled thereby.

One of the principal objects of the present invention is to provide a conveyor system incorporating a power conveyor line and branch free conveyor lines wherein loads may be automatically transferred either to or from the power conveyor line without any requirement for operator attendance at the time of transfer.

Another object is to provide a system of this type which requires no movable track switches at the juncture between power and free conveyor tracks.

Another object is to incorporate what may be termed a selective preconditioning feature whereby any free line may be optionally conditioned either to receive the next load to come along the power line or to permit such load to pass and likewise whereby any free load may be positioned adjacent the power line and conditioned to be automatically transferred into the next open space in the power conveyor to come along.

Another object is to accomplish all transfer operations entirely by power derived from the main conveyor line without resorting to supplemental manual, electrical, hydraulic, air or like motor controls of any kind.

Another object is to adapt such system to the installation of free conveyor branch lines at desired points along any existing conventional overhead chain propelled trolley conveyor system without requiring any modification of the existing conveyor tracks or change to the power line other than to provide suitable load hooks on the power conveyor trolleys.

Another object is to provide positively acting transfer means for moving a loaded free trolley into a transfer position at the power conveyor line.

Another object is to provide automatic means for coordinating the actuation of such transfer means with the approach of an unloaded power trolley and to permit passage of any number of loaded power trolleys which may precede such unloaded power trolley without actuation of such transfer means.

Another object is to provide for automatic reconditioning of such transfer means to an operative position for effecting a further transfer after the completion of each transfer to the power conveyor line.

Another object is to provide a load hanger construction adapted to provide driving engagement between a power trolley and a free trolley during the transfer of such load bar therebetween in either direction.

Another object is to utilize such load hanger as the selective element in initiating a transfer utilizing the presence of such load hanger on a power trolley coupled with the prepositioning of a free trolley in receiving position adjacent the power line as a selective combination for initiating transfer of load between the power line and free line; and is utilizing the absence of a load hanger on an approaching power trolley as the selective element in initiating a transfer of load from a free line to a power line.

These and other objects will be more apparent from the following detailed description of a preferred embodiment of my invention and from an examination of the drawings illustrating such embodiment wherein.

Figures 1, 7, 8:
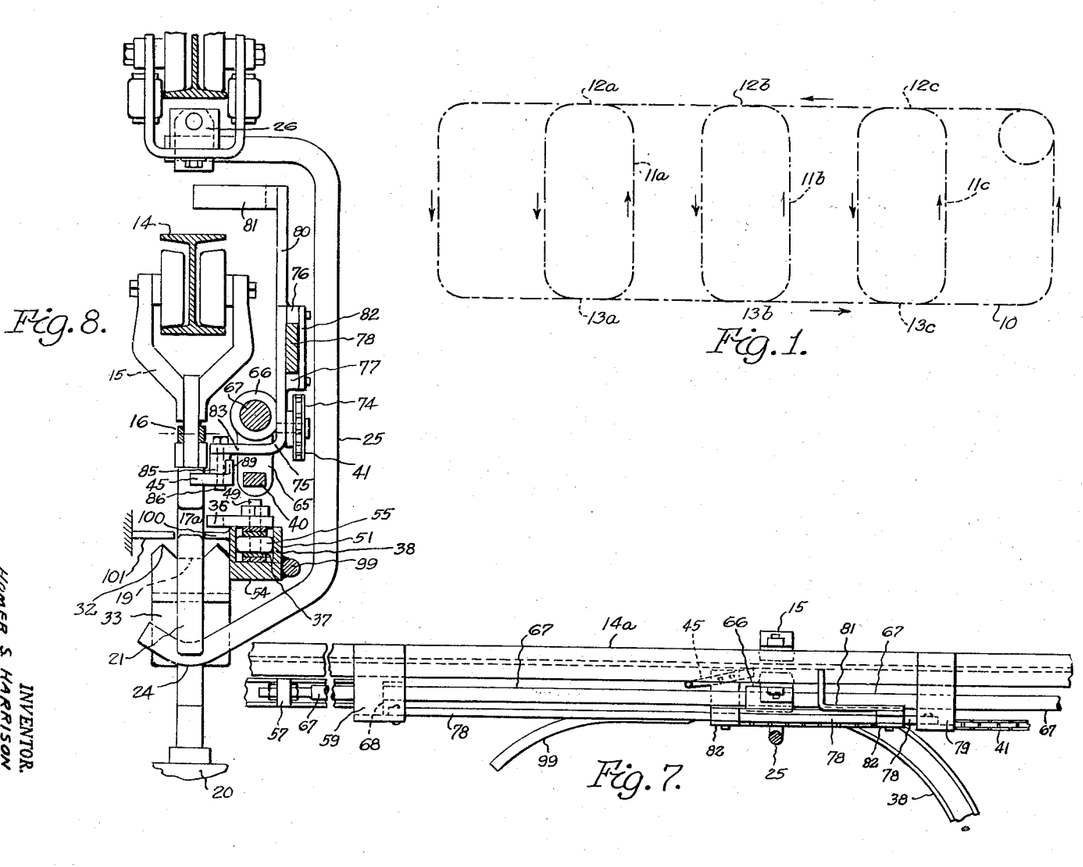
Fig. 1 is a plan view of a typical layout incorporating one outside endless power line and three intermediate free lines.
Fig. 7 is a similar view taken along the line 7—7 of Fig. 5.
Fig. 8 is a sectional end elevation taken along the line 8—8 of Fig. 5.
Figures 2, 3, 4:
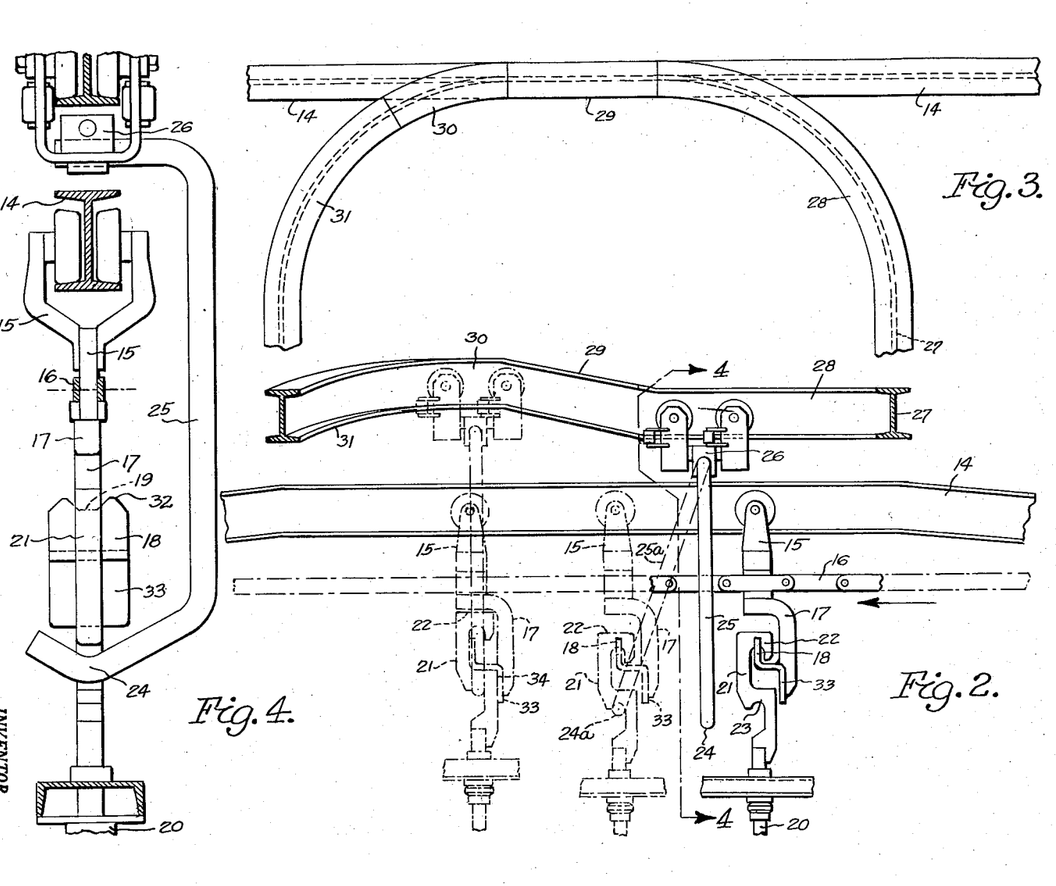
Fig. 2 is a side elevation of a power-to-free transfer section.
Fig. 3 is a plan view of the conveyor track at such power-to-free transfer section.
Fig. 4 is a sectional end elevation taken along the line 4—4 of Fig. 2.

Referring to Fig. 1 it will be seen that a single power conveyor line 10 may be adapted to serve a plurality of intermediate free conveyor lines 11a, 11b, 11c having power-to-free transfer sections 12a, 12b, 12c at one end and free-to-power transfer sections 13a, 13b, 13c at the other end. As shown in Figs. 2 and 3, the endless power line comprises an overhead conveyor track 14 on which power trolleys 15 circulate continuously, being driven by an endless conveyor chain 16 as is conventional in the art. The lower end of each load carrying power trolley is provided with an integrally attached load hook which in the present embodiment comprises a rectangular depending bar 17 to which is rigidly attached a relatively wider hook member 18, the upper end of which is formed with a central recess 19, as best seen in Fig. 4, adapted to engage a load hanger 20 at a point on the vertical centerline of the power trolley 15. Rigidly attached to the upper end of the load hanger 20 is a special double-hook member 21 having an upper hook 22 formed therein for engagement with the hook member 18 of a power trolley and having a second hook 23 formed therein on the same vertical centerline facing in an opposite direction adapted for engagement with a transversely extending hook portion 24 of a load bar 25 pivotally suspended along a transverse axis from a free trolley assembly 26 which is adapted to travel along a free conveyor track 27. At each power-to-free transfer section the free conveyor track 27 is provided with a curved horizontal section 28 leading into an upwardly inclined section 29 immediately above the path of the power conveyor track 14 followed by a short curved horizontal section 30 and a downwardly inclined curve section 31 which in plan view departs from the power conveyor track 14 on the same side as the lead-in section 28.

As will be understood from the above description of Figs. 1 to 4, as a loaded power trolley 15 approaches an unloaded free trolley 26 which has been manually moved to and left at the position shown in Fig. 2 at the end of the lead-in section 28, the load hook 21 at a point immediately below the hook recess 23 will engage the free trolley hook member 24 extending into its path and initially cause the bar 25 to pivot to an inclined position as shown in phantom at 25a thereby drawing the hook 24 upwardly into engagement with the recess 23 as shown in phantom at 24a after which further travel of the power trolley will cause the bar 25 to pull the free trolley 26 along the upwardly inclined section 29 of the free trolley track thereby raising the load hook 21 out of engagement with the power trolley hook 18 and above the level of the projection 32 of such hook whereafter continued propelling engagement by the laterally extending surface 33 at the lower end of the power hook member 18 with the adjacent surface 34 of the load hook 21 will move the load hanger and supporting free trolley onto the curved section 30 leading horizontally away from the power track which will effect a lateral shifting of the load hook 21 away from the power hook 18, the respective hook components and curved section 30 in the free conveyor track being so proportioned as to cause the free trolley 26 to begin its travel down the inclined section 31 by the time the surfaces 33 and 34 of the respective power trolley and load hooks have moved laterally relative to each other out of propelling engagement. The free trolley 26 will thereafter move by gravity down the inclined section 31 to a position completely free of any possible interference with subsequent loaded power trolleys.

It will also be understood from the above description and an examination of Figs. 2 and 4 of the drawings that when a free trolley 26 is moved to the position shown in Fig. 2, any unloaded power trolleys preceding a loaded power trolley will be free to pass through the bar 25 and its hook 24 without contacting the same so that an operator who wishes to effect a power-to-free transfer of the next load to come along need not await the approach of such loaded trolley before moving the free trolley into a receiving position but instead may move the free trolley into the receiving position shown in Fig. 2 at any time and leave it unattended pending the arrival of the next load, as well as during and subsequent to the automatically effected transfer.

Figures 5, 6, 9:
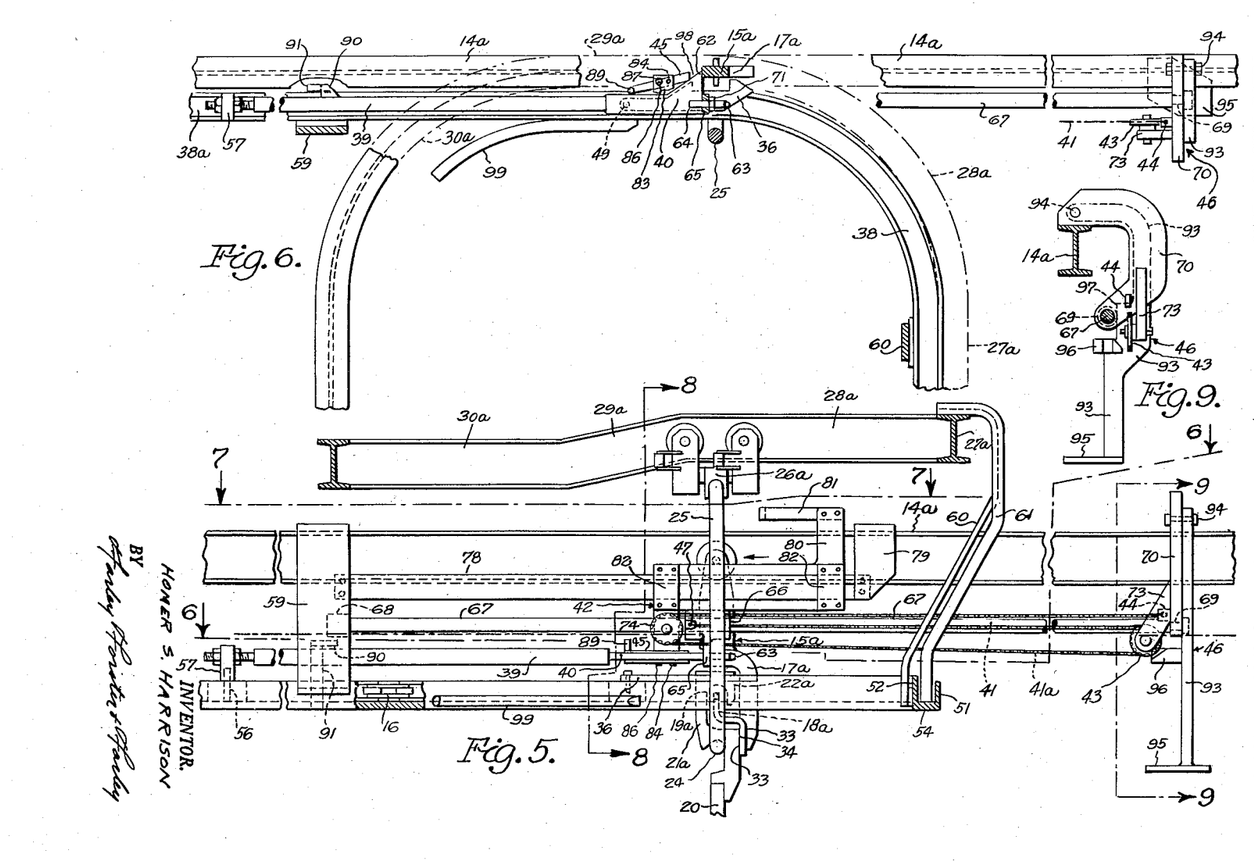
Fig. 5 is a side elevation of a free-to-power transfer section showing power and free trolleys at the transfer point.
Fig. 6 is a plan view of such free-to-power transfer section taken along the line 6—6 of Fig. 5.
Fig. 9 is a similar view taken along the line 9—9 of Fig. 5.
Figure 10:
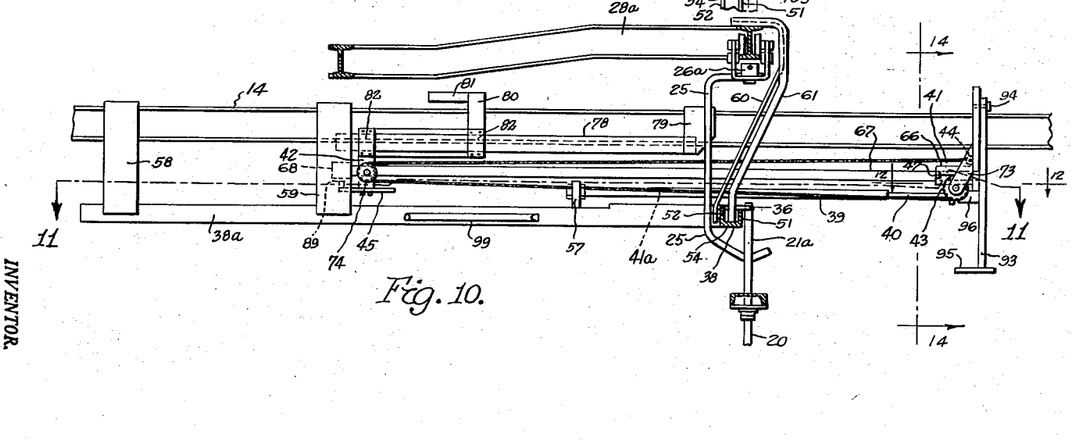
Fig. 10 is a side elevation similar to Fig. 5 showing the transfer mechanism at the beginning of the feed-in cycle.
Figure 11:
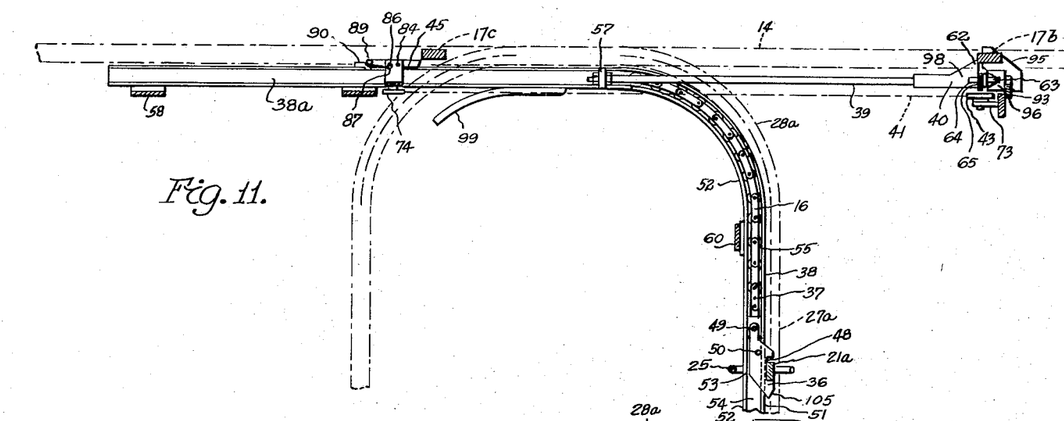
Fig. 11 is a plan view taken along the line 11—11 of Fig. 10.
Figure 15:
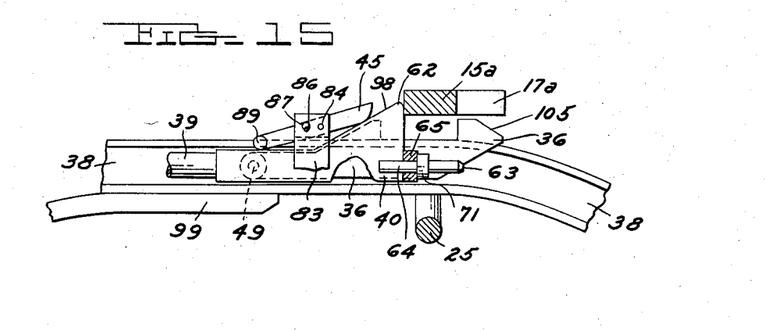
Fig. 15 is an enlarged, partial view of the mechanism shown in Fig. 6.
Figure 16:
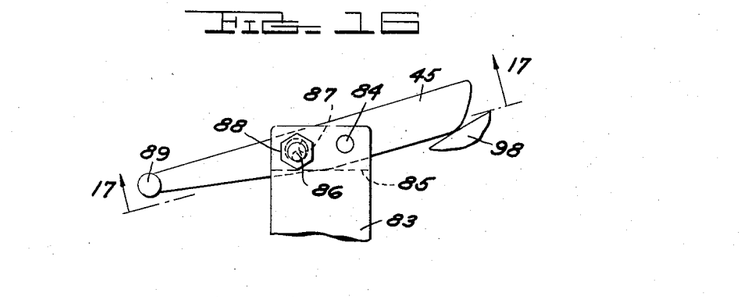
Fig. 16 is a further enlargement of a portion of the mechanism shown in Fig. 15.

Referring to Figs. 5 and 6 showing a transfer section for free-to-power transfer, it will be seen that the free conveyor track 27a (indicated in the plan view in phantom only) is provided with a curved horizontal section 28a leading to a downwardly inclined section 29a immediately above the power conveyor track 14a followed by a curved horizontal section 30a leading away from the power conveyor track. When the hook surface 34 of a load hook 21a of a loaded free trolley assembly 26a in the position shown in Fig. 5 is propellingly engaged by the hook surface 33 of an unloaded power trolley 15a, movement imparted to the free trolley 26a down the inclined section 29a causes a lowering of the load hook 21a onto the power hook 18a in a manner just the reverse of the power-to-free transfer. However, in the case of free-to-power transfer it is apparent that a loaded free trolley may not be left unattended in the path of the power conveyor to await the arrival of the next unloaded power trolley due to the interference which would occur with any preceding loaded power trolleys. Accordingly, to permit this transfer to be effected automatically without the necessity for an operator to stand by awaiting the arrival of an unloaded power trolley, provision is made to leave the loaded free trolley in a clearance position, as shown in Fig. 11, on the approach of the free conveyor track 27a to the power conveyor track which will permit the passage of any preceding loaded power trolleys. Transfer is then automatically accomplished through the use of transfer mechanism adapted to propel the loaded free trolley into the path of the first approaching unloaded power trolley. Such transfer mechanism which is described in detail later comprises in general a latch 36 for engaging the load hook 21a on a free trolley in clearance position as shown in Fig. 11 and for feeding it into transfer position as shown in Figs. 6 and 15, a push-pull actuating chain 37 for reciprocating the latch; a guide track 38 for guiding the latch and the actuating chain; a push-pull rod 39 for actuating the chain; a dog 40 for engaging an unloaded power trolley and imparting pushing actuation to the rod 39; a chain 41 for imparting pulling actuation to the rod 39; a reciprocable sprocket assembly 42, a fixed sprocket 43 and a fixed anchor point 44 for actuating the chain 41; a drive dog 45 engageable by the power trolley for moving the sprocket assembly 42 in the direction of power conveyor travel; and a pivoted assembly 46 for selectively distinguishing between loaded and unloaded power trolleys in initiating actuation of the transfer mechanism in response to the approach of an unloaded trolley only. While the operation of this transfer mechanism may be understood more clearly following a detailed description of the component parts thereof, it may be noted generally that the transfer feed mechanism utilizes propulsion by an unloaded power trolley to actuate the feed-in latch 36 to the position shown in Figs. 6 and 15 and thereafter utilizes continued propulsion of a different member by the same power trolley to effect a return of the latch 36 to its initial position as shown in Fig. 11. Return movement of the latch 36 is effected by moving the sprocket assembly 42 in the direction of power conveyor travel which effects an opposite movement of the movable anchor point 47 of the chain 41 together with the rod 39 connected to such anchor point, while propelling movement of the movable anchor point 47 of the chain 41 in the direction of conveyor travel imparts an opposite movement of the sprocket assembly 42.

Proceeding now to a detailed description of the transfer feed mechanism components as best shown in Fig. 11, the latch 36 consists of a plate having a rectangular notch 48 adapted to engage the top end of the load hook 21a. One end of the latch is pivotally connected by a pin 49 to the roller chain 37 while the position of the other end of the latch is controlled by a guide pin 50 which is mounted on latch 36 and extends downwardly and is adapted to ride along the inner surface of track member 51 of the guide track 38 as well as by the edge 53 of the latch and adjacent surface of the track member 52. The latch is adapted to ride along the top surface of track member 51 connected by a transverse track member 54 to the track member 52. The rollers 55 of the chain 37 engage the inner surfaces of track members 51, 52 serving to confine the path of the roller chain so that it may be employed both in tension and compression to effect a reciprocating movement of the latch along the curved section of the track 38. The chain guide track 38 is suspended in fixed position from the power conveyor track by straps 58 and 59 and from the free conveyor track by straps 60 and 61. Such track is provided with a longitudinal portion 38a extending parallel to the power conveyor line and the end of the roller chain 37 in such portion is connected by a pin 56 (see Fig. 5) to a bracket 57 which is adapted to ride along the top edges of the track members 51 and 52 and impart reciprocating movement to the roller chain and latch through its connection with the push-pull rod 39.

Figure 12:
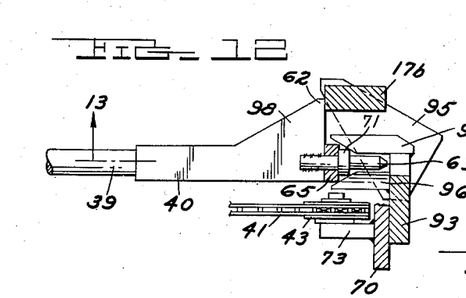
Fig. 12 is an enlarged view taken at 12—12 of Fig. 10.
Figure 13:
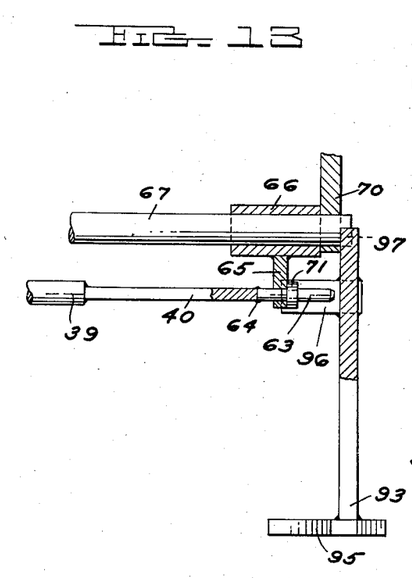
Fig. 13 is a view taken at 13—13 of Fig. 12.

The other end of the push-pull rod 39 is welded to the actuating dog 40 which consists of a flat plate having a lateral projection 62 adapted to normally extend into the path of the top end of a power trolley bracket member 17a (Figs. 5, 6 and 15). A cylindrical pin extension 63 which extends axially from dog 40 and engages guide member 96 and is welded at 64 to the dog 40 and such pin is pivotally suspended by a vertical link 65 from a cylindrical sleeve 66 (Figs. 5, 7 and 8) which is adapted to slide longitudinally along the fixed guide rod 67 connected at one end by bracket 68 to the strap hanger 59 and at the other end by a bolt 69 to a fixed hanger 70 rigidly secured to the top surface of the power conveyor track 14a. The right end of the push-pull rod 39 is thus pivotally suspended from the sleeve 66 by the link 65 (Figs. 12, 13, and 14) in a manner which will accommodate a lateral movement of the dog 40 through articulation of the sleeve 66 and link 65 about the axis of the guide rod 67 while the link 65 through engagement with the dog 40 on one side and collar 71 fixed to the pin 63 on the other side provides a longitudinal driving link between the push-pull rod 39 and sleeve 66.

As shown in Fig. 5, the moving end 47 of the actuating chain 41 is secured to the sleeve 66 and such chain passes over a fixed sprocket 43 mounted on the fixed hanger 70 by bracket 73 and extends forward from such fixed sprocket to the sprocket 74 on the reciprocable assembly 42 and thence back to the fixed anchor point 44 on the hanger 70. As best shown in Figs. 5 and 8, the sprocket 74 is rotatably mounted on an angle member 75 which is bolted to slide bars 76, 77 which are in turn adapted to ride on a fixed guide bar 78 connected at one end to the strap hanger 59 and at the other end to a fixed hanger 79 mounted on the power conveyor track 14a. The slide bars 76, 77 are secured at their other ends to an upwardly extending member 80 which at its upper end has an angle pusher bar 81 secured thereto for a purpose later described. The slide bars 76 and 77 are also connected to plates 82 which engage the side of the guide bar 78 opposite that engaged by members 75 and 80 thus completing the sliding assembly 42 which is confined to the longitudinal path established by the guide bar 78.

Figure 17:
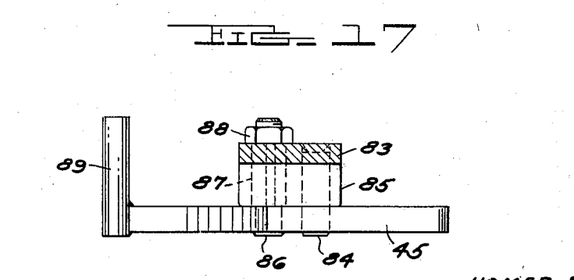
Fig. 17 is a section taken at 17—17 of Fig. 16.

The laterally projecting leg 83 of the angle member 75 carries the dog 45 which is pivotally connected thereto by a pin 84 (Figs. 5, 6, 15, 16, and 17) which extends through the spacer 85 (Figs. 8 and 17) secured to the lower face of the angle bracket leg 83. A vertical pin 86 (Fig. 17) projecting upwardly from the dog 45 at a point longitudinally spaced from the pivot pin 84 passes through a cylindrical hole 87 extending through the spacer 85 and bracket leg 83, the clearance between the hole 87 and pin 84 serving to limit the articulation of the dog 45 about the pin 84.

Another vertical pin 89 projecting upwardly from the end of the dog 45 is adapted to engage a fixed cam 90 secured by bracket 91 (Fig. 5) to the outward sides of the track 38a in a drive release direction at the completion of the transfer feed operation as later described.

The only remaining components of the transfer feed mechanism which have not been described relate to the selector assembly 46 best shown in Figs. 5, 6, 9 and 14. This consists of a laterally offset depending bar 93 pivotally connected at 94 to hanger 70. A cam 95 is connected to the bottom of the bar 93 and projects laterally into the path of the load hook 21 of a hanger 20 on any passing loaded power trolley (Fig. 14) but extends below the level of any unloaded power trolley. A pair of tapered guide members 96 project forwardly at the level of the push rod pin 63 which is adapted to enter between such guide members when the push rod is in its fully retracted position as shown in Figs. 10, 11, 12, 13 and 14.

Figure 14:
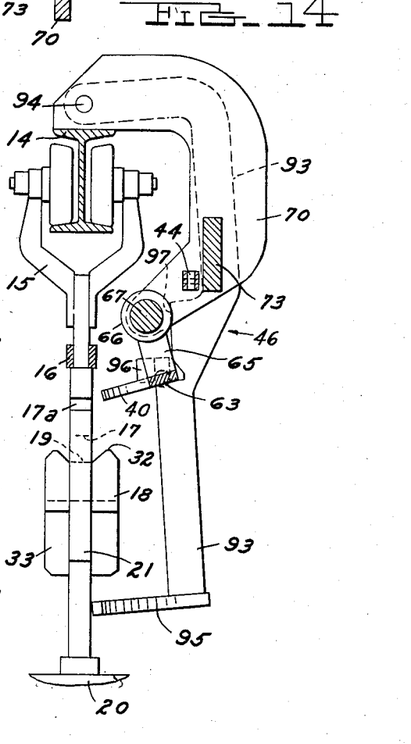
Fig. 14 is a section taken at 14—14 of Fig. 10 and shows the construction in Fig. 9 in an alternate position.

The off-center weight of the assembly 46 establishes normal engagement of a shoulder 97 with the head of the bolt 69 establishing the normal position of the cam member 95 and guide members 96. When the pin 63 is engaged between the guide members 96, and a loaded power trolley passes the cam 95, the hook member 21 of the load hanger 20 engages the cam 95 causing a lateral displacement of the guide members 96 thereby moving the pin 63 and attached dog 40 laterally to a position which will cause the power trolley bracket member 17a to by-pass the dog 40 (Fig. 14). However, when an unloaded trolley passes, the selector mechanism is not actuated and the dog 40 is engaged by the upper end of the power trolley bracket member 17a thereby initiating the transfer feed operation. Such operation will now be described in detail.

At the beginning of a transfer cycle the latch 36 will be in the position shown in Fig. 11, the pin 63 of the push rod 39 will be engaged between the guide members 96 and the sprocket assembly 42 will be in its forwardmost position with the pin 89 of the dog 45 actuated by cam 90 to a clearance position for passing the horizontally aligned portion of a power trolley bracket member such as 17c. When a loaded free trolley is moved toward the latch 36, the upper end of the load hook 21a will engage the tapered surface 105 at the pointed end of the latch displacing such hook end laterally from its normal centerline position until it comes into registry with the notched portion 48 of the latch whereupon the load hook will be moved by gravity into full engagement with the latch as shown. Such loaded free trolley may then be left unattended to await the arrival of an unloaded power trolley. Any preceding loaded power trolley will actuate the selector assembly to prevent such power trolley's engagement with the dog 40 and pass the transfer section without actuation of the transfer feed mechanism. When an unloaded power trolley approaches the selector mechanism without engaging the cam 95, the forward upper end of the power trolley bracket member such as 17b will engage the end of the dog 40 and, through actuation of the push rod 39, chain 37 and latch 36, will move the loaded free trolley along the entrance curve 28a of the free conveyor track. The conveyor track 28a departs gradually from the curved path of the latch member 36 established by the chain track 38, as best shown in Fig. 6, in order to effect disengagement of the load hook 21a from the latch recess 48 at or just prior to the moment when the power and free trolleys reach the tangent point in their respective conveyor tracks. Movement of the latch 36 is synchronized with the power trolley in a manner which will cause the upper hook surface 22a of the load hook to pass laterally over the relatively wide power trolley hook member 18a as the power trolley and free trolley approach such tangent point in the respective tracks. Due to the substantial width of the power trolley hook 18a, an overlapping relationship with the load hook 21a will initially occur substantially in advance of the tangent juncture of the respective paths of power and free trolleys and the lower surface 33 of the power hook member 18a will be in a position to undertake driving engagement with the surface 34 of the load hook 21a at the moment the latter hook is disengaged by the latch 36.

Hook recess 19a of power trolley hook 17 engages with a mating recess in the load hook. It will be noted from Fig. 5 that the end 22a of the load hook extends below the hook recess 19a in the power trolley hook in order to prevent overtravel of the free trolley moving down the inclined portion 29a of the free conveyor track. Thus, the position of the free trolley is positively controlled by latch 36 during travel into the path of a power hook and until after an overlapping relationship preventing relative longitudinal movement is established between the load hook 21a and power hook 18a which results in the position of the free trolley being positively controlled by the power trolley at the time the load hook 21a becomes disengaged from the latch 36.

During the entire time that the dog 40 is propelled toward the tangent point of power and free conveyor tracks, the forward movement of the sleeve 66 and chain end 47 will cause the lower side 41a of the chain 41 to move back at a speed equal to conveyor speed and, through the action of the sprocket 74 and fixed anchor point 44, cause the assembly 42 to move back at a speed equal to one half of conveyor speed. Accordingly, as the power trolley approaches the tangent point of power and free conveyor tracks, the dog 45 carried by the assembly 42 will approach the angular surface 98 on the forward side of dog 40 and through engagement with such surface cause the dog 40 to move laterally out of engagement with the upper end of the power trolley bracket member 17a while such interengagement of dogs 45 and 40 will at the same time move the driving end or rightward end of the dog 45 into the path of the same power trolley bracket member 17a for engagement thereby immediately following the disengagement of dog 40. It will be understood that the relative travel of the dogs 40 and 45 may be coordinated to produce disengagement of the dog 40 just as the respective trolleys reach the tangent point of conveyor tracks or slightly thereafter. The exact instant of disengagement of the dog 40 is not critical except that it must occur after an overlapping relationship between the power hook 18a and load hook 21a has been established; and likewise the exact instant of driving engagement of the dog 45 by the power trolley bracket 17a is not critical except that it must follow the disengagement of the load hook 21a by the latch 36.

As soon as the dog 40 becomes disengaged from the power trolley bracket member 17a, the forward travel of the sleeve 66 and chain end 47 and the rearward travel of the sprocket assembly 42 will terminate and as soon as the dog 45 is engaged by such power trolley bracket member, the assembly 42 will begin to move forwardly at conveyor speed causing the chain end 47, sleeve 66 and rod 39 to move backwardly at twice conveyor speed thereby returning the latch 36 rapidly to its initial load engaging position. Such return travel of the feed mechanism is terminated by the engagement of a pin 89 on the dog 45 with the stationary cam member 90, as shown in Fig. 11, which actuates the dog 45 to a drive release position for passing the power trolley and any subsequent loaded power trolleys which may precede the next transfer operation.

When the dog 45 is initially engaged by the power trolley bracket 17a and driven forwardly with the assembly 42, the free trolley assembly 26a will move down the inclined track section 29a under the control of the power trolley hook 18a thereby effecting a transfer of the load hanger hook 21a from the free trolley to the power trolley load hook 18a. The free trolley 26a will thereafter be moved onto the horizontal curved section 30a of the free conveyor track through the engagement of the pusher dog 81 with the rear end of the free trolley assembly 26a while the stationary curved guide 99 is simultaneously engaged by the bar 25 of the free trolley in order to insure complete disengagement of the free trolley hook 24 from the load hook 21a during the propelling engagement of the dog 81 with the free trolley 26a. Thus the free trolley is positively moved to a clearance position where it cannot interfere with the passage of subsequent loaded or unloaded power trolleys as a part of the final restoration cycle of the transfer feed mechanism.

In order to assure accurate positioning of the power trolley bracket 17a during the transfer operation, the straight portion 38a of the chain guide track is provided with a straight guide 100, as shown in Fig. 8, adapted to be slidingly engaged by the power trolley bracket member 17a to prevent any lateral oscillation. A similar guide member 101 may be provided on the other side if desired in order to positively confine the power trolley bracket 17a to a fixed path.

From the above description of a preferred embodiment it will be seen that a conveyor system has been provided which meets each of the objects set forth at the beginning of the specification. While this embodiment has been described in detail it will be understood that numerous modifications may be resorted to without departing from the scope of my invention as defined in the following claims.

I claim:

1. In an overhead trolley conveyor system, a power trolley conveyor track, driven trolleys on said track provided with load suspension means, a free trolley conveyor track in fixed relation to said power conveyor track and having a nonparallel transfer section adjacent said power track, a free trolley riding in said free track and having load suspension means adapted to extend adjacent to the load suspension means of a driven trolley when both trolleys are at said transfer section, a load hanger, means on said hanger for alternately engaging the load suspension means of both driven and free trolleys, means on said load hanger for effecting a free trolley drive coupling with a driven trolley when suspended from either trolley at said transfer section, said respective means being adapted in response to the conjoint movement of said driven trolley, free trolley and load hanger along said nonparallel transfer track sections to effect a transfer of said load hanger from one to the other of said trolleys.

2. In an overhead trolley conveyor system, a power trolley conveyor track, driven trolleys on said track provided with load suspension means, a free trolley conveyor track in fixed relation to said power track having a nonparallel power-to-free transfer section adjacent said power track, a free trolley movable to said section having load suspension means adapted to extend adjacent to the load suspension means of passing empty driven trolleys, a load hanger, means on said hanger for engaging the load suspension means of a driven trolley, means on said hanger when suspended on a driven trolley for propelling said free trolley along said adjacent track section, and means on said hanger for engaging the load suspension means on said free trolley, said last means being rendered operative to transfer the load hanger to said free trolley through movement along said nonparallel track section.

3. In an overhead trolley conveyor system, a power trolley conveyor track, driven trolleys on said track provided with load suspension means, a free trolley conveyor track having a nonparallel power-to-free transfer section adjacent said power track and a connected nonparallel free-to-power transfer section adjacent another portion of said power track, a free trolley having load suspension means adapted to extend adjacent to the load suspension means of passing empty driven trolleys when said free trolley is moved to said power-to-free transfer section, a load hanger, means on said hanger for engaging the load suspension means of a driven trolley, means on said hanger when suspended on a driven trolley for propelling said free trolley along said power-to-free transfer section, means on said hanger for engaging the load suspension means on said free trolley, said last means being rendered operative to transfer the load hanger to said free trolley through movement along said nonparallel power-to-free transfer section, said free trolley being movable with load hanger to a point on said free track approaching said free-to-power transfer section which will permit passage of loaded driven trolleys, means actuated by an empty driven trolley approaching said latter transfer section for moving said free trolley with load hanger from said point to said transfer section, means on said hanger for effecting a free trolley drive coupling with said empty driven trolley along said latter transfer section, said first-named means on said hanger for engaging the load suspension means of a driven trolley being rendered operative to transfer the load hanger to said driven trolley through movement along said nonparallel track section.

4. In an overhead trolley conveyor system, a power trolley conveyor track, driven trolleys on said track provided with load suspension means, a free trolley conveyor track in fixed relation to said power track having a lead-in section approaching said power track, a nonparallel free-to-power transfer section adjacent said power track and a lead-out section departing from said power track, a free trolley on said free track provided with load suspension means, a load hanger, means on said hanger for engaging the load suspension means of said free trolley, means synchronized with an empty driven trolley approaching said transfer section for moving said free trolley with load hanger to said transfer section, means on said hanger for effecting a free trolley drive coupling at said transfer section with said empty driven trolley, and means on said hanger for engaging the load suspension means of said empty driven trolley, said last means being rendered operative to transfer the load hanger to said driven trolley through movement along said nonparallel track section.

5. Conveyor mechanism as set forth in claim 3 wherein said free track power-to-free transfer section has an upwardly inclined portion, and wherein said free track free-to-power transfer section has a downwardly inclined portion relative to said power track.

6. Conveyor mechanism as set forth in claim 1 wherein said free track transfer section extends above said power track.

7. Conveyor mechanism as set forth in claim 1 wherein said transfer track sections are vertically spaced and wherein the load suspension means of a trolley on the upper section extends below the load suspension means of a trolley on the lower section.

8. Conveyor mechanism as set forth in claim 1 wherein said power and free conveyor tracks generally extend along paths in different vertical planes, which planes are tangent at said transfer sections, and wherein the load suspension means of a trolley on the upper transfer track section includes an offset member extending laterally around the lower track and any trolley thereon and below the load suspension means of such lower trolley.

9. Conveyor mechanism as set forth in claim 1 wherein said power and free conveyor tracks generally extend along paths in different vertical planes, which planes are tangent at said transfer sections, and wherein the load suspension means of a trolley on the upper transfer track section includes an offset member extending laterally around the lower track and any trolley thereon and below the load suspension means of such lower trolley, said offset load suspension means being pivotally connected to its trolley on a transverse axis.

10. Conveyor mechanism as set forth in claim 1 wherein said transfer track sections are vertically spaced with the free conveyor track above the power conveyor track, and wherein the load suspension means of a free trolley on the upper transfer section extends below the load suspension means of a power trolley on the lower power track section.

11. Conveyor mechanism as set forth in claim 1 wherein said power and free conveyor tracks generally extend along paths in different vertical planes, which planes are tangent at said transfer sections, wherein the free transfer track section extends above the power transfer track section, and wherein the load suspension means of a free trolley on the upper transfer track section includes an offset member extending laterally around the power track and any trolley thereon and below the load suspension means of such trolley.

12. Conveyor mechanism as set forth in claim 1 wherein said power and free conveyor tracks generally extend along paths in different vertical planes, which planes are tangent at said transfer sections, wherein the free transfer track section extends above the power transfer track section, wherein the load suspension means of a free trolley on the upper transfer section includes an offset member extending laterally around the power track and any trolley thereon and below the load suspension means of such trolley, and wherein said offset load suspension means is pivotally connected to its free trolley on a transverse axis.

13. A conveyor system comprising a power conveyor track, driven trolleys on said track having load suspension means, a free conveyor track in fixed relation to said power track, free trolleys on said latter track having load suspension means, said power and free conveyor tracks generally extending along paths in different vertical planes, power-to-free transfer sections in said tracks wherein said vertical planes are substantially tangent, the free track extending above the power track at said transfer sections, the load suspension means of a free trolley at said transfer section including an offset member extending laterally around the power track and any driven trolley thereon, and below the load suspension means of such driven trolley, a load hanger having an upper hook for suspension from said power trolley and a lower hook aperture adapted to engage the load suspension means of a free trolley at said transfer section establishing thereby a temporary driving connection for said free trolley, said power and free tracks having vertically diverging paths at said transfer sections adapted to exchange a load hanger suspended from a driven trolley to the load suspension means of a free trolley during the driving engagement thereof.

14. Conveyor mechanism as set forth in claim 13 wherein said power and free conveyor tracks are provided with horizontally diverging paths at the end of said transfer sections whereby said free trolley and load transferred thereto may be moved away from the path of said power conveyor during the final drive engagement with said power trolley.

15. Conveyor mechanism as set forth in claim 13 where in said power and free conveyor tracks are provided with horizontally diverging paths at the end of said transfer sections whereby said free trolley and load transferred thereto may be moved away from the path of said power conveyor during the final drive engagement with said power trolley, and wherein said free conveyor track is provided with a downward slope extending beyond the point of final drive engagement by said driven trolley whereby said free trolley and load hanger transferred thereto may automatically move by gravity away from said power conveyor line.

16. Conveyor mechanism as set forth in claim 4 including selective means responsive to a load hanger on a driven trolley approaching said transfer section adapted to prevent engagement of said free trolley with load hanger with said synchronizing means so that said free trolley will remain removed from said transfer section.

17. Conveyor mechanism as set forth in claim 4 wherein said means for moving said free trolley with load hanger to said transfer section is actuated directly by said approaching empty driven trolley.

18. Conveyor mechanism as set forth in claim 4 wherein said means for moving said free trolley with load hanger to said transfer section is actuated directly by said approaching empty driven trolley, and includes propelling mechanism adapted to engage a loaded free trolley at a clearance position on the free track approach to the power track and to move with said free trolley substantially to the juncture of the paths of said free and driven trolleys.

19. Conveyor mechanism as set forth in claim 4 wherein said means for moving said free trolley with load hanger to said transfer section is actuated directly by said approaching empty driven trolley, and includes propelling mechanism adapted to engage a loaded free trolley at a clearance position on the free track approach to the power track and to move with said free trolley substantially to the juncture of the paths of said free and driven trolleys, and means for returning said propelling mechanism to said clearance position.

20. Conveyor mechanism as set forth in claim 4 wherein said means for moving said free trolley with load hanger to said transfer section is actuated directly by said approaching empty driven trolley, and includes propelling mechanism adapted to engage a loaded free trolley at a clearance position on the free track approach to the power track and to move with said free trolley substantially to the juncture of the paths of said free and driven trolleys, and means for returning said propelling mechanism to said clearance position, said last-named means being actuated by further travel of said driven trolley beyond said juncture.

21. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism, and selective mechanism actuated by a load hanger on a driven trolley approaching said transfer section for moving said coupling mechanism to a nonengageable position for preventing actuation of said propelling mechanism.

22. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism, and selective mechanism actuated by a load hanger on a driven trolley approaching said transfer section for moving said coupling mechanism to a nonengageable position for bypassing actuation of said propelling mechanism, said propelling mechanism including a latch for engaging the load hanger on a free trolley, a chain for pulling said latch, and a guide track for defining the path of said chain and latch.

23. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism, and selective mechanism actuated by a load hanger on a driven trolley approaching said transfer section for moving said coupling mechanism to a nonengageable position for bypassing actuation of said propelling mechanism, said propelling mechanism including a latch for engaging the load hanger on a free trolley, a chain for pulling said latch, and a guide track for defining the path of said chain and latch, and said coupling mechanism including a rod extending adjacent the power track, said rod being connected at one end to said chain and, a drive dog on the other end of said rod, a fixed guide for defining the path of said drive dog, and a connection between said dog and said fixed guide accommodating lateral displacement of said dog between engageable and nonengageable positions.

24. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism, and selective mechanism actuated by a load hanger on a driven trolley approaching said transfer section for moving said coupling mechanism to a nonengageable position for bypassing actuation of said propelling mechanism, said propelling mechanism including a latch for engaging the load hanger on a free trolley, a chain for pulling said latch, and a guide track for defining the path of said chain and latch, said coupling mechanism including a rod extending adjacent the power track, said rod being connected at one end to said chain and, a drive dog on the other end of said rod, a fixed guide for defining the path of said drive dog, and a connection between said dog and said fixed guide accommodating lateral displacement of said dog between engageable and nonengageable positions, and said selective mechanism including a pivoted arm engageable by said drive dog, a cam on said arm engageable by a load hanger on an approaching driven trolley, the displacement of said cam and resulting articulation of said arm by a passing load hanger being adapted to move said drive dog to a nonengageable position during passage of the associated driven trolley.

25. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism and returning mechanism for moving said propelling mechanism back to said clearance position.

26. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism and returning mechanism for moving said propelling mechanism back to said clearance position, said returning mechanism including a dog engageable by a driven trolley beyond said juncture of free and driven trolleys, a fixed guide for defining the path of said dog along said power track, a chain connected to said coupling mechanism, a fixed sprocket for reversing the direction of said chain, and means driven by said dog for actuating said chain to effect reverse movement of said coupling mechanism.

27. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism and returning mechanism for moving said propelling mechanism back to said clearance position, said returning mechanism including a dog engageable by a driven trolley beyond said juncture of free and driven trolleys, a fixed guide for defining the path of said dog along said power track, a chain connected to said coupling mechanism, a fixed sprocket for reversing the direction of said chain, and means driven by said dog for actuating said chain to effect reverse movement of said coupling mechanism, said last means including a sprocket movable with said dog for engaging said chain, and a fixed reaction point for connecting the end of the chain associated with said last sprocket.

28. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism and returning mechanism for moving said propelling mechanism back to said clearance position, said returning mechanism including a dog engageable by a driven trolley beyond said juncture of free and driven trolleys, a fixed guide for defining the path of said dog along said power track, a chain connected to said coupling mechanism, a fixed sprocket for reversing the direction of said chain, and means driven by said dog for actuating said chain to effect reverse movement of said coupling mechanism, said dog and coupling mechanism interacting to terminate engagement of said coupling mechanism and initiate engagement of said dog by said driven trolley after said propelling mechanism has advanced said loaded free trolley to said juncture.

29. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism and returning mechanism for moving said propelling mechanism back to said clearance position, said returning mechanism including a dog engageable by a driven trolley beyond said juncture of free and driven trolleys, a fixed guide for defining the path of said dog along said power track, a chain connected to said coupling mechanism, a fixed sprocket for reversing the direction of said chain, means driven by said dog for actuating said chain to effect reverse movement of said coupling mechanism, and a fixed cam for actuating said dog to disengage said driven trolley when said coupling and propelling mechanisms are returned to starting position.

30. Conveyor mechanism as set forth in claim 4 wherein said means for moving said free trolley with load hanger to said transfer section comprises propelling mechanism for engaging a loaded free trolley at a clearance position on the free track approach to the power track and for moving with said free trolley substantially to the juncture of the paths of said free and driven trolleys, coupling mechanism normally engageable by said approaching empty power trolley for actuating said propelling mechanism and returning mechanism for moving said propelling mechanism back to said clearance position, said returning mechanism including a dog engageable by a driven trolley beyond said juncture of free and driven trolleys, a fixed guide for defining the path of said dog along said power track, a chain connected to said coupling mechanism, a fixed sprocket for reversing the direction of said chain, means driven by said dog for actuating said chain to effect reverse movement of said coupling mechanism, and means also actuated by said dog for engaging said free trolley after transfer of said load hanger to said driven trolley and propelling said free trolley to a clearance position on the lead-out section of free conveyor track.

References Cited in the file of this patent

UNITED STATES PATENTS 569,448    Dudley  ---------------- Oct. 13, 1896

(Other references on following page)

UNITED STATES PATENTS

| | | |
|---|---|---|
| 570,025 | Kennedy et al. | Oct. 27, 1896 |
| 709,692 | Acklin | Sept. 23, 1902 |
| 1,855,678 | Jensen | Apr. 26, 1932 |
| 1,865,788 | Raymond | July 5, 1932 |
| 1,875,966 | Webb et al. | Sept. 6, 1932 |
| 2,344,155 | McBride et al. | Mar. 14, 1944 |
| 2,546,373 | Rayburn et al. | Mar. 27, 1951 |
| 2,546,374 | Rayburn et al. | Mar. 27, 1951 |
| 2,580,758 | Gibson | Jan. 1, 1952 |